United States Patent [19]

Bolliger

[11] Patent Number: 5,199,673
[45] Date of Patent: Apr. 6, 1993

[54] CROSS-TYPE CLAMP AND CONNECTION PRODUCED THEREBY BETWEEN TWO CROSSED WIRE CABLES, AND WIRE CABLE NET WITH CROSS-TYPE CLAMPS

[75] Inventor: Reinhold Bolliger, Windisch, Switzerland

[73] Assignee: Brugg Drahtseil AG, Birr, Switzerland

[21] Appl. No.: 729,364

[22] Filed: Jul. 12, 1991

[30] Foreign Application Priority Data

Sep. 14, 1990 [EP] European Pat. Off. ......... 90117708.9

[51] Int. Cl.⁵ .............................................. B21F 27/00
[52] U.S. Cl. .............................................. 245/2; 245/4
[58] Field of Search ..................... 245/2, 3, 4, 8

[56] References Cited

U.S. PATENT DOCUMENTS 686,232 11/1901 Maher ........................................ 245/2

*Primary Examiner*—Douglas D. Watts
*Attorney, Agent, or Firm*—Marmorek, Guttman & Rubenstein

[57] ABSTRACT

Cross-type clamp (1) for connecting two crossed wire cables (5,6) at the points of crossing of the wire cables or wire cable sections of wire cable nets, in particular rockfall nets, by means of two clamp parts (4, 11) which are held together by claws (9) and exert a pressing force on the wire cables (5, 6) at the point of crossing, for increasing the load capacity of the cross-type clamp (1), for each claw (9) belonging to one (11) of the two clamp parts (4, 11), there being provided on the other clamp part (4) a slot (2) for guiding the claw (9) through, and the end piece of the claw (9) guided through the slot (2) and projecting beyond the slot (2) being bent back.

8 Claims, 1 Drawing Sheet

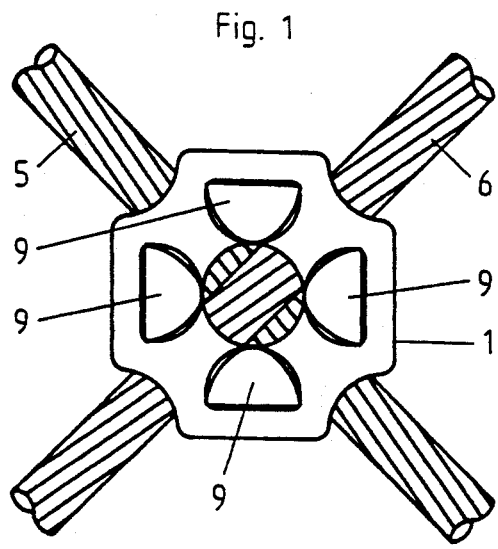
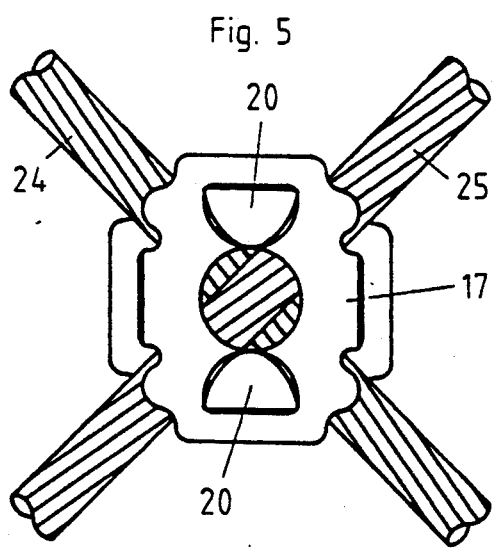
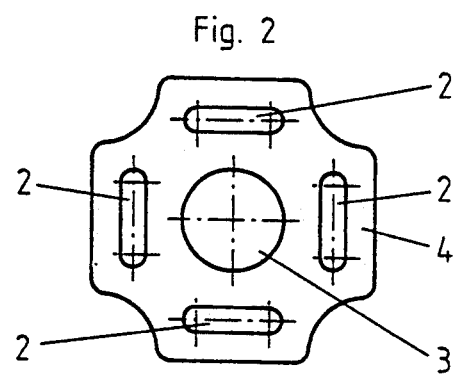
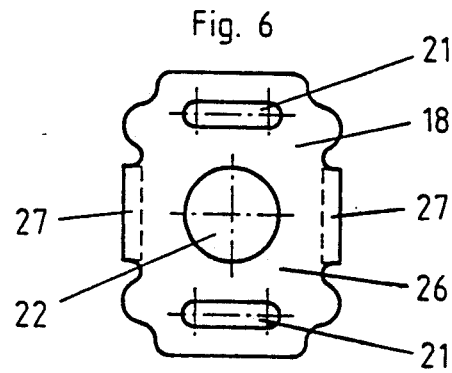
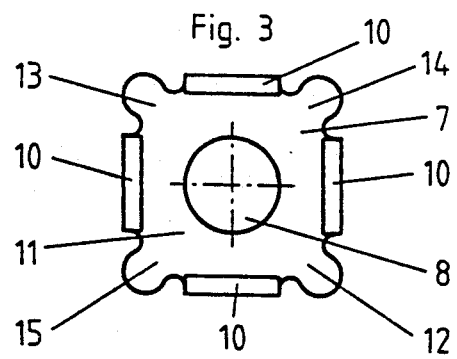
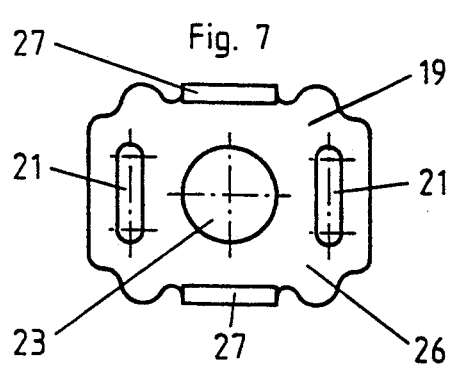
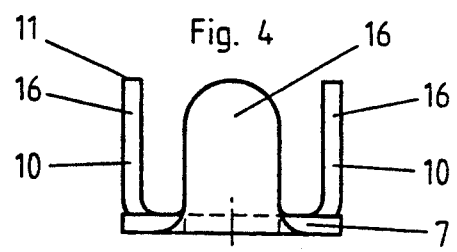
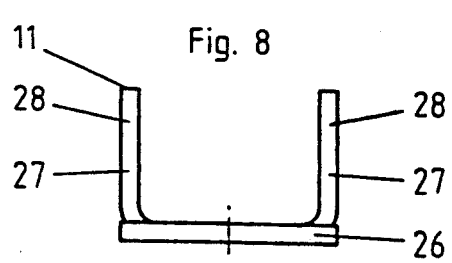

CROSS-TYPE CLAMP AND CONNECTION PRODUCED THEREBY BETWEEN TWO CROSSED WIRE CABLES, AND WIRE CABLE NET WITH CROSS-TYPE CLAMPS

The invention relates to a cross-type clamp for clamping together two crossed wire cables or wire cable sections at the point of crossing by means of two clamp parts which are held together by claws and exert a pressing force on the wire cables at the point of crossing and each have a bearing surface for a respective one of the two crossed wire cables, and whereof at least one is provided with at least one pair of mutually opposing clamps, and the invention further relates to a connection produced by such a cross-type clamp, between two crossed wire cables or wire cable sections, and to a wire cable net provided with such cross-type clamps.

Cross-type clamps of this type have been known for a long time and are chiefly used as connection elements for connecting in each case two crossed wire cables at the points of cable crossing of snow nets and rockfall nets.

The known cross-type clamps of this type are as a rule produced from surface-treated sheet steel having a sheet thickness of 1.0 to 2.5 mm, and have, as the clamp parts, a base part which is conventionally designated a claw part and which is substantially square and downwardly convex in the shape of a cap, and which has arranged on the four sides of the square shape, before the wire cables are connected by the cross-type clamp, four vertically upwardly pointing tabs connected in one piece to the base part, and a cover part, conventionally designated the cover and also substantially square and upwardly convex in the shape of a cap, and for connecting the wire cables by means of the cross-type clamp, first one of the two crossed wire cables is inserted in two diagonally opposing intermediate spaces between in each case two tabs of the base part, and thereafter the other of the two crossed wire cables is inserted in the other two diagonally opposing intermediate spaces between in each case two tabs of the base part, and thereafter the cover part of the cross-type clamp is placed on the two crossed wire cables with the four corners of its square shape in the four intermediate spaces between the four tabs of the base part, and subsequently the base part and the cover part of the cross-type clamp and thus also the wire cables are pressed together at their point of crossing, and the four tabs are bent around to form the claws reaching over the cover part.

These known cross-type clamps have generally proved successful, in particular in the case of snow nets, but when using these cross-type clamps for rockfall nets it has been shown that the cross-type clamps frequently cannot withstand extreme loads, such as occur when very heavy rocks fall onto rockfall nets, but burst open, whereupon the connections of the wire cables at their points of crossing are loosened and the mesh size of the rockfall net, at the point where a very heavy rock falls, is suddenly enlarged at the moment of the fall such that the rock can pass through the enlarged mesh and the rockfall net thus no longer fulfils its function in the case of very heavy rocks and consequently no longer offers a protection, but on the contrary represents a potential danger, because it allows precisely the very heavy rocks to pass through, for all those who rely on the protective action of the rockfall net.

For this reason, for rockfall nets in which extreme loads must be reckoned with because the position provided, for connecting the crossed wire cables at the points of crossing, use has begun to be made of pins bent in a U shape and having a thread at both ends and a clamping jaw which is provided with two holes for the legs of the U-shaped pin and which is pushed onto the pin legs and tightened with nuts, and which as a rule is constructed as a shaped casting and is provided, on the side facing the wire cables, with depressions for fixing the position of the crossed wire cables. Although connections of this type of crossed wire cables can in practice only be loosened if the shaped casting forming the clamping jaw breaks, and are therefore substantially safer than connections with the known cross-type clamps, the technical expense for such connections with U-shaped pins is a multiple of the technical expense for producing and assembling a cross-type clamp, particularly because such connections with U-shaped pins have to be mounted by hand and the assembly of such a connection is for this reason extremely labour-intensive, whereas by comparison cross-type clamps are as a rule assembled by machine.

It was therefore the object of the invention to provide a cross-type clamp of the type mentioned at the outset which on the one hand offers a substantially higher level of safety from bursting open than the known cross-type clamps of the type mentioned at the outset and on the other hand is connected with a substantially smaller technical expense than the said connections of crossed wire cables having U-shaped pins and clamping jaws.

In accordance with the invention, this is achieved with a cross-type clamp of the type mentioned at the outset in that, for each claw belonging to one of the two clamp parts, there is provided on the other clamp part a slot for guiding the claw through, and the end piece of the claw guided through the slot and projecting beyond the slot is bent back.

The main advantage of the present cross-type clamp is that, by guiding the claws through slots, a yielding movement of the claws in the opening direction under an extreme load, which as a rule was the cause of bursting open in the known cross-type clamps under an extreme load, is eliminated. Because of this, there results the further advantage that under extreme load the claws are subjected chiefly to tension in the longitudinal direction of the claws or tabs whose bending around forms the claws, and tensile loads which could lead to tearing in the claws can hardly occur even under the most extreme loads when exceptionally heavy rocks fall.

Advantageously, with the present cross-type clamp two pairs of mutually opposing claws can be provided which are preferably arranged offset by 90° with respect to one another. In the case of a preferred embodiment of the present cross-type clamp, one of the two clamp parts is here provided with the two pairs of mutually opposing claws and the other clamp part is provided with the four slots provided for the two claw pairs. Admittedly, this preferred embodiment requires different clamp parts, but, under the prerequisite that the clamp part provided with the slots is arranged on the uphill side and the clamp part provided with the claws is arranged on the downhill side of the wire cable net, it has the advantage of the highest capacity for loads of all possible embodiments. In the case of another very advantageous embodiment of the present cross-type clamp with two pairs of mutually opposing claws, each of the two clamp parts is provided with a respective pair of mutually opposing claws and two slots for the claw pair of the respectively other clamp part. This latter embodiment has the advantage of clamp parts which are the same as one another and the advantage resulting therefrom that two tools are not required for producing two different clamp parts but only one tool is required for producing the two clamp parts which are the same as one another, and thus the production costs and moreover also the storage costs are somewhat smaller than in the case of two different clamp parts, but the capacity for load with this embodiment is slightly smaller than with the above-mentioned preferred embodiment, but is of course still a multiple of the capacity for load of the known cross-type clamps. Which of these two embodiments is more advantageous thus depends on whether the highest load capacity of the said preferred embodiment is required for the given application case or whether the somewhat smaller load capacity of the last-mentioned embodiment would indeed be adequate. In the former case, the said preferred embodiment is of course more advantageous, whereas in the latter case the last-mentioned embodiment is more advantageous because of the lower production costs.

In a particularly simple embodiment of the present cross-type clamp, finally, only one of the two clamp parts is provided with a pair of mutually opposing claws, and the other clamp part is provided with two slots provided for this one claw pair. With this embodiment, although the two clamp parts are also of different construction and thus require two different tools for their production, these tools are of course less complicated and thus less expensive to produce than in the case of the said preferred embodiment, and moreover have a longer service life, so that the production costs of the cross-type clamp are with this simple embodiment substantially below the production costs with the said preferred embodiment, and in most cases are even slightly less than in the case of the above-mentioned other advantageous embodiment. However, the load capacity with this simple embodiment is significantly below that of the said preferred embodiment, but nevertheless this simple embodiment, in addition to its inexpensive uncomplicated tools, also has the advantage of a load capacity which is a multiple of the load capacity of the known cross-type clamps.

Advantageously, in the case of the present cross-type clamp, the claws are formed from tabs of sheet metal which have their end pieces bent around and which are preferably connected in one piece to the associated clamp part, and whereof the end pieces projecting beyond the slots are preferably rounded off in a semi-circle.

Particularly advantageously, the present cross-type clamp can be further developed such that the slots are rounded off at their slot ends preferably in a semi-circle in cross-section, and have an opening width w above the sheet thickness s of the metal sheet forming the tabs and a slot length l which is above the tab breadth b and which, for fixing the position of the tabs or claws within the slots, where $l \approx b + w - \sqrt{w^2 - s^2}$, is preferably almost equal to the sum of the tab breadth b and the slot opening width w less $\sqrt{w^2 - s^2}$, and where $l \approx b + 0.414s$ is advantageously almost equal to the sum of the tab breadth b and 0.414 times the sheet thickness s of the metal sheet forming the tabs. Such a further development has the advantage that the claws are fixed within the slots, although the opening width of the slots, for ease of insertion of the claws or tabs therein, is somewhat larger than the sheet thickness of the metal sheet forming the claws or tabs, and that this fixing does not permit even the slightest yielding of the claws under extreme load, and thus guarantees that the claws are loaded substantially only with tension under extreme load.

The invention furthermore relates to a connection between two crossed wire cables or wire cable sections with the present cross-type clamps, the advantage whereof is the already explained substantially higher load capacity than with the known cross-type clamps.

Furthermore, the invention also relates to a wire cable net, in particular a rockfall net, in which preferably all, but at least some of the crossings of two wire cables or wire cable sections of the wire cable net are each provided with a cross-type clamp according to the invention. The advantage of such wire cable nets by comparison with the known wire cable nets with known cross-type clamps is their applicability, in particular as a rockfall net, even under the most difficult application conditions.

The invention is explained in more detail below by some example embodiments, with reference to the figures which follow and in which:

FIG. 1 shows an example embodiment of a cross-type clamp according to the invention, connecting two crossed wire cables and having different clamp parts, in plan view;

FIG. 2 shows the clamp part which is on top in FIG. 1 of the cross-type clamp shown in FIG. 1, in plan view;

FIG. 3 shows the clamp part which is on the bottom in FIG. 1 of the cross-type clamp shown in FIG. 1, in plan view;

FIG. 4 shows the bottom clamp part, shown in plan view in FIG. 3, of the cross-type clamp shown in FIG. 1, in side view with a direction of view horizontal in FIG. 3;

FIG. 5 shows an example embodiment of a cross-type clamp according to the invention, connecting two crossed wire cables and having clamp parts which are the same as one another, in plan view;

FIG. 6 shows the clamp part which is on top in FIG. 1 of the cross-type clamp shown in FIG. 5, in plan view;

FIG. 7 shows the clamp part which is on the bottom in FIG. 5, of the cross-type clamp shown in FIG. 5, in plan view; and FIG. 8 shows the bottom clamp part shown in plan view in FIG. 7, of the cross-type clamp shown in FIG. 5, in side view with a direction of view horizontal in FIG. 7.

The preferred example embodiment, shown in FIGS. 1 to 4, of the present cross-type clamp 1 includes the upper clamp part 4, shown in FIG. 2, provided with four slots 2 and a central circular cutout 3 and forming the cover part, and the lower clamp part 11, which is shown in FIGS. 3 and 4 in the state before connection of the two crossed wire cables 5 and 6, which has a base part 7 with a central circular cutout 8 and four tabs 10, connected in one piece to the base part 7, fitting in the slots 2 and provided for forming the claws 9 when the two wire cables 5 and 6 are connected, and which forms the claw part.

The two clamp parts 4 and 11 are punched out of sheet steel having a sheet thickness of 2.5 mm and are of a steel suitable for cold forming without the formation of cracks, having a high strength, a high tensile yield strength and a great elongation at rupture, such as St3K40 or, in the case of very high stresses, St 67. In the case of the lower clamp part 11, after the punching procedure the tabs 10 are also bent back at right angles to the base part 7. After punching and bending back the tabs 10 in the case of the lower clamp part 11, the clamp parts 4 and 11 are also galvanized and chromed by surface treatment processes already used with the known cross-type clamps.

To bring about the connection between the two crossed wire cables 5 and 6 by means of the cross-type clamp 1, first the wire cable 5 is inserted in the intermediate spaces 12 and 13 and thereafter the wire cable 6 is inserted in the intermediate spaces 14 and 15 between the tabs 10 of the lower clamp part 11, and then the upper clamp part 4 is pushed onto the tabs 10, fitting the slots 2 of the upper clamp part 4, of the lower clamp part 11 under a pressure great enough for the edges of the tabs 10 to be pushed very slightly at a depth below 50 μm and on average approximately 25 μm into the slot ends, which are rounded off in a semi-circle, of the slots 2 which have an opening width of w=3.5 mm and a slot length l=14 mm greater than the tab breadth b=13 mm, and thus the position of the tabs 10 within the slots 2 and thus the position of the upper clamp part 4 are fixed precisely relative to the lower clamp part 11. On continuing to push together the upper and lower clamp parts 4 and 11, resulting at the same time as the edges of the tabs 10 are pushed into the slot ends of the slots 2, a pressure increasing continuously with this pushing together is exerted on the two wire cables 5 and 6 at their point of crossing, and this pressure is increased to approximately 210 bar. As a result of the high pressure, the wire cables 5 and 6 here yield at the point of crossing into the cutouts 8 and 3 which are provided for this purpose and which replace the above-mentioned cap-shaped convex formations provided for the same purpose in the case of the known cross-type clamps. After this pressing together of the wire cables 5 and 6 and the upper and lower clamp parts 4 and 11, the end pieces 16 of the tabs 10 guided through the slots 2, which project beyond the slots 2, are bent around as shown in FIG. 1 and thus the claws 9 are formed from the tabs 2. The bending around of these end pieces 16 of the tabs 10 here can be initiated as early as during the pressing together of the wire cables 5 and 6 and the upper and lower clamp parts 4 and 11, but is definitively completed only after or at the earliest at the end of this pressing together. The cross-type clamp 1, finished by this bending around and connecting the wire cables 5 and 6 at their point of crossing, is illustrated in plan view of the upper clamp part 4 in FIG. 1.

Testing of the load capacity of the cross-type clamp illustrated in FIG. 1 showed that the opening force for this cross-type clamp was, at approximately 12 kN, about four times as high as the opening force for the known cross-type clamps mentioned at the outset, and thus results in a load capacity of the cross-type clamp in FIG. 1 which is far above the maximum loads occurring in extreme cases. The so-called displacement force at which displacement of the wire cable 5 and/or 6 relative to the cross-type clamp 1 begins could, by comparison with the known cross-type clamps mentioned at the outset, also be increased by 10 to 20%, although it should be noted here that the known cross-type clamps mentioned at the outset already fulfilled the requirements as regards the displacement force, and the increase in displacement force achieved by the cross-type clamp 1 was thus only an advantageous secondary effect, not sought from the outset, of the substantial increase in opening force achieved.

The other, very advantageous embodiment, shown in FIGS. 5 to 8, of the present cross-type clamp 17 differs from the preferred embodiment, shown in FIGS. 1 to 4, of the present cross-type clamp substantially only in that in the case of the cross-type clamp 17 each of the two clamp parts 18 and 19 is provided with a respective pair of mutually opposing claws 20 and two slots 21 for the claw pair of the other clamp part in each case. In the case of the cross-type clamp 17, too, both clamp parts 18 and 19 are for the same purpose as in the case of the cross-type clamp 1 provided with a respective central cutout 22 and 23, and each of the two clamp parts 18 and 19 has, in the state illustrated in FIGS. 6 to 8, before connection of the two crossed wire cables 24 and 25, two tabs 27 which are connected in one piece to the base part 26, fit in the slot 21, and are provided for formation of the claws 20 on connection of the two wire cables 24 and 25.

The two clamp parts 18 and 19 of the cross-type clamps 17 are of the same sheet metal with the same sheet thickness of the clamp parts 4 and 11 of the cross-type clamp 1, and are surface-treated in the same manner as the clamp parts 4 and 11, after the punching procedure and the bending back of the tabs 27 at right angles to the base tab 26.

To bring about the connection between the two crossed wire cables 24 and 25 by means of the cross-type clamp 17, first of all the two wire cables 24 and 25 here are fixed, and then the two clamp parts 18 and 19 are offset with respect to one another by 90°, are pushed from both sides over the point of crossing of the wire cables 24 and 25, and the tabs 27 of the two clamp parts 18 and 19 are inserted in the slots 21 of the other clamp part in each case, and the subsequent pressing procedure and the bending around of the end pieces 28 of the tabs 27 to form the claws 20 then takes place in the same manner as in the case of the cross-type clamp 1.

The load capacity of the cross-type clamp 17 shown in FIG. 5 is, as regards the opening force, approximately 10 to 20% lower than in the case of the cross-type clamp 1 in FIG. 1, which is to be attributed to the fact that, of the four claws 20 of the cross-type clamp 17, only two are on the uphill side of a rockfall net and the other two are on the downhill side thereof, and as regards the displacement force, the load capacity of the cross-type clamp 17 shown in FIG. 5 is approximately the same size as that of the cross-type clamp 1 in FIG. 1.

I claim:

1. Cross-type clamp for clamping together two crossed wire cables or wire cable sections at the point of crossing by means of two clamp parts, the clamp parts comprising claws holding together the clamp parts, and the clamp parts exerting a pressing force on the wire cables at the point of crossing and each of which having a bearing surface for a respective one of the two crossed wire cables, and at least one of which being provided with at least one pair of mutually opposing claws, wherein for each claw belonging to one of the two clamp parts, there is provided on the other clamp part a slot for guiding the claw through, the claw being guided through the slot and the end piece of the claw projecting beyond the slot being bent back, and wherein the claws are formed from tabs of sheet metal having their end pieces bent around and being connected in one piece to the associated clamp part, the end pieces of the tabs projecting beyond the slots being rounded off, and wherein the slots being rounded off at their slot ends and having an opening width w above the sheet thickness s of the sheet metal forming the tabs and a slot length l above the tab breadth, which slot length l is, for fixing the position of the tabs or claws, with $l \approx b+w-\sqrt{w^2-s^2}$ at least approximately equal to the sum of the tab breadth b and the slot opening width w less $\sqrt{w^2-s^2}$ and with $l \approx b+0.414s$ at least approximately equal to the sum of the tab breadth b and 0.414 times the sheet thickness s of the sheet metal forming the tabs.

2. Cross-type clamp according to claim 1, wherein two pairs of mutually opposing claws are provided.

3. Cross-type clamp according to claim 2, wherein the two paris of mutually opposing claws are arranged offset by 90° with respect to one another.

4. Cross-type clamp according to claim 2, wherein one of the two clamp parts is provided with the two pairs of mutually opposing claws and the other clamp part is provided with the four slots provided for the two claw pairs.

5. Cross-type clamp according to claim 2, wherein each of the two clamp parts is provided with a respective pair of mutually opposing claws and two slots for the respective claw pair of the other clamp part.

6. Cross-type clamp according to claim 1, wherein one of the two clamp parts is provided with a pair of mutually opposing claws, and the other clamp part is provided with two slots provided for this one claw pair.

7. Connection between two crossed wire cables or wire cable sections with a cross-type clamp according to claim 1.

8. Wire cable net for cushioning stones in rockfall ranges, wherein at least a part of the points of crossing of two wire cables or wire cable sections of the wire cable net are each provided with a cross-type clamp according to claim 1.

* * * * *